Figure 1:
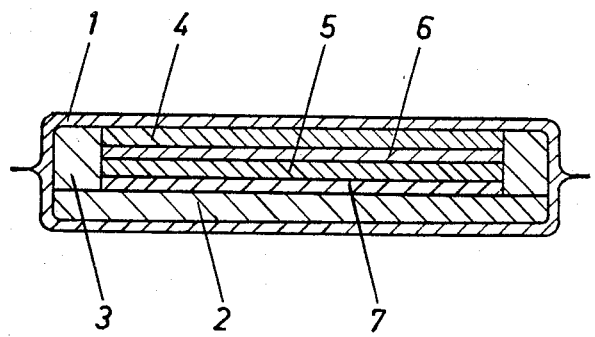

United States Patent

[11] 3,594,576

[72] Inventors Hans Josef Muller-Rech
 Schrobenhausen;
 Theodor Fischer, Hannover, both of,
 Germany
[21] Appl. No. 830,325
[22] Filed June 4, 1969
[45] Patented July 20, 1971
[73] Assignee Agfa-Gevaert Aktiengesellschaft
 Leverkusen, Germany
[32] Priority Dec. 4, 1968
[33] Germany
[31] P 18 12 664.2

[54] X-RAY FILM HOLDER INCLUDING AN EVACUABLE ALUMINUM ENVELOPE
 4 Claims, 2 Drawing Figs.
[52] U.S. Cl................................................. 250/68,
 250/213 VT
[51] Int. Cl....................................................G03b 41/16

[50] Field of Search............................................ 250/68

[56] References Cited
 UNITED STATES PATENTS
 2,974,229 3/1961 Schmidt et al................ 250/68
 3,119,015 1/1964 Kollock......................... 250/68
 3,392,281 7/1968 Sherwood..................... 250/68

Primary Examiner—James W. Lawrence
Assistant Examiner—C. E. Church
Attorney—Michael S. Striker ABSTRACT: An X-ray film holder comprising a cover of laminated foil, prepared from an aluminum bag coated on both sides, and of a bottom plate for supporting the X-ray film which is arranged between two intensifying foils, the bottom plate being provided on at least three sides thereof with a raised border or edge, which edges are tightly joined to one of the reinforcing foils.

PATENTED JUL20 1971

3,594,576

INVENTOR
JOSEF MULLER-RECH
THEODOR FISCHER

ATTORNEY

X-RAY FILM HOLDER INCLUDING AN EVACUABLE ALUMINUM ENVELOPE

This invention relates to a new X-ray film holder, which can be evacuated in order to increase the contact between the X-ray film and the intensifying foils which cover the X-ray film on both sides.

Generally film and intensifying foils for medical X-ray photographs are stored in metal holders, the covers of which have to guarantee a uniform contact of the film/foil combination. However, under repeated use, the shutter spring can become exhausted thereby resulting in an insufficient contact of the X-ray film with the foils. It has already been proposed to use flexible holders made from sturdy plastics which can be evacuated and welded. For these purposes for an outside cover, often foils of polyethylene are used which are colored to prevent light penetration. It is entirely dependent on the quality of the plastic foil used whether the degree of evacuation originally achieved in the flexible holder can be maintained over long periods.

According to the invention, a new X-ray film holder has now been discovered which consists of a light and gastight elastic cover for the storage of an X-ray film/intensifying combination, which cover allows for the maintenance for substantially unlimited times of a decreased pressure and which simultaneously increases the quality of the photograph by a further reduction of the distance between the object and film. The X-ray film holder in accordance with the invention consists of an aluminum bag coated on both sides to provide a laminated foil and of a bottom plate for supporting the X-ray film, which is arranged between two booklike formed foils, the bottom plate being provided on at least three sides thereof with a raised border or edge, which edges are tightly joined to one of the booklike reinforcing foils.

Figure 2:
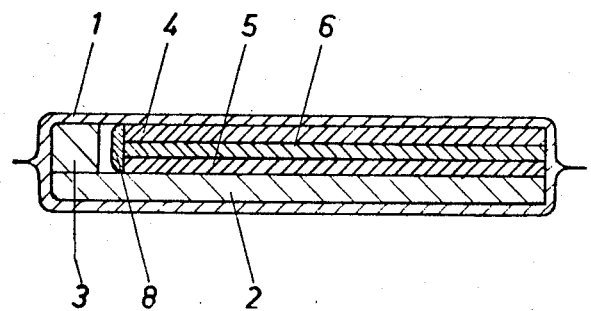

The invention will be further illustrated and described by reference to the drawing wherein:

FIG. 1 is a sectional view of an embodiment of an X-ray film holder in accordance with the invention; and FIG. 2 is a longitudinal sectional view of an embodiment of an X-ray film holder in accordance with the invention.

Preferably, the aluminum bag is coated on the outside thereof with a cellophane foil which itself is supplied with a layer of vinylchloride-vinylidene chloride copolymerizate and is coated on its inner side with a polyethylene foil for welding purposes. By the use of an aluminum bag and by evacuation of the holder just prior to the taking of the photograph, a dosage reduction of a third as compared with the dosage applied with the use of metal holders is made possible.

Generally, the thickness of the aluminum foil amounts to from about 0.012 to 0.020 mm. The size of the bottom plate is dependent on the size of the film to be used, the height of the border or edge is dependent on the thickness of the X-ray film and the intensifying foils with the proviso that the upper foil forms a homogenous surface with the upper limit of the border or edge. The intensifying combination of the front and back foil most usually used is pasted or glued at one of the long sides thereof with a tape, by which means a booklike shape of the reinforcing foils is obtained. For so-called on-the-table photographs, an additional lead foil is inserted between the bottom plate and the back foil.

The X-ray film can easily be inserted from the borderless side of the bottom plate between the intensifying foils. Also, the bottom plate-foil combination thusly prepared can very easily be introduced into the aluminum bag without displacement of the foils or the film on the bottom plate taking place. The charged bag can be evacuated and welded in a commercial vacuum packing machine. In this manner, the closest contact between the film and the foils is obtained and the shape blurring which usually results from nonuniform contact pressure can be avoided.

A further advantage of the holder in accordance with the invention is the excellent visibility of colored marks placed on the upper side of the aluminum bag which can be made for showing the center point and the coated side of the bag. This excellent visibility in darkened photography rooms results from the highly reflecting background of the bag.

Referring to FIGS. 1 and 2 of the drawing, which show embodiments of the X-ray film holder of the invention, the reference numeral 1 designates an aluminum bag and 4, 5 and 6 a film-foil combination, 8 designates a book back for the foils, 2 and 3 edges or borders of the bottom plate and 7 a lead foil.

While the invention has been illustrated and described as embodied in an X-ray film holder, it is not intended to be limited to the details shown, since various modifications and structural changes may be made without departing in any way from the spirit of the present invention.

What we claim as new and desired to be protected by Letters Patent is set forth in the appended

1. An X-ray film and holder therefor comprising a flat rectangular X-ray film having opposite faces; a pair of rectangular intensifying foils respectively abutting against said opposite faces of said film; connecting means securing said foils to each other along one edge of said film and foils so as to form a stack; an open receptacle for said stack, said receptacle comprising a rectangular bottom plate secured to one of said foils and ledges projecting upwardly from three sides of said bottom plate so as to surround said stack on three sides, said ledges having upper faces flush with the other of said foils and an evacuated envelope snugly and airtightly surrounding said stack and said receptacle, said envelope comprising an aluminum foil coated with weldable plastic on its inner face and with a plastic on its outer face and being sealed by welding around the periphery of said envelope thereby providing additional security against air leakage and light penetration.

2. The X-ray film and holder as defined in claim 1, wherein said aluminum foil is coated on its inner face with a layer of polyethylene and on its outer face with a layer of cellophane which in turn is coated on its outer face with a layer of a vinylchloride-vinylidene chloride copolymerizate.

3. The X-ray film and holder as defined in claim 2, wherein said envelope is rectangular.

4. The X-ray film and holder as defined in claim 1, further comprising a lead foil between said stack and said bottom plate of said receptacle.